US006435796B1

United States Patent
Iversen

(10) Patent No.: US 6,435,796 B1
(45) Date of Patent: Aug. 20, 2002

(54) METHOD AND ARRANGEMENT FOR TRANSPORTING LOAD UNITS

(76) Inventor: Øyvind T. Iversen, Bjerkeveien 9, N-1440 Drøbak (NO)

( * ) Notice: Subject to any disclaimer, the term of this patent is extended or adjusted under 35 U.S.C. 154(b) by 0 days.

(21) Appl. No.: 09/529,861

(22) PCT Filed: Oct. 1, 1998

(86) PCT No.: PCT/NO98/00295
§ 371 (c)(1),
(2), (4) Date: Jun. 21, 2000

(87) PCT Pub. No.: WO99/20553
PCT Pub. Date: Apr. 29, 1999

(30) Foreign Application Priority Data

Oct. 20, 1997 (NO) .................................................. 974834

(51) Int. Cl.[7] .............................................. B63B 27/00
(52) U.S. Cl. ................ 414/139.9; 414/139.6; 414/140.1; 414/803
(58) Field of Search ........................ 414/139.9, 140.1, 414/340, 341, 347, 495, 803

(56) References Cited

U.S. PATENT DOCUMENTS 3,612,312 A * 10/1971 Berhmann .................. 214/152
5,501,566 A * 3/1996 Engle ......................... 414/333
5,618,148 A * 4/1997 Iversen et al. ............ 414/139.9

FOREIGN PATENT DOCUMENTS

GB  2291032  * 1/1996
SE  8804364  * 6/1990

* cited by examiner

Primary Examiner—Christopher P. Ellis
Assistant Examiner—Mark A. Deuble
(74) Attorney, Agent, or Firm—Libert & Associates

(57) ABSTRACT

The present invention relates to a method and arrangement for transporting larger cargo units, for example containers (5), said method and arrangement comprising standardized individual cargo trolleys (1a, 1b, ..., 1n) for each pallet (4a, 4b ..., 4n), and one correspondingly standardized pallet for each cargo unit (5), so as to form a train of a plurality of similar trolleys matching with a similar train of standard pallets, said train of trolleys being further provided with automatic locking and securing means as well as means for running said trolleys through curves and slopes.

17 Claims, 8 Drawing Sheets

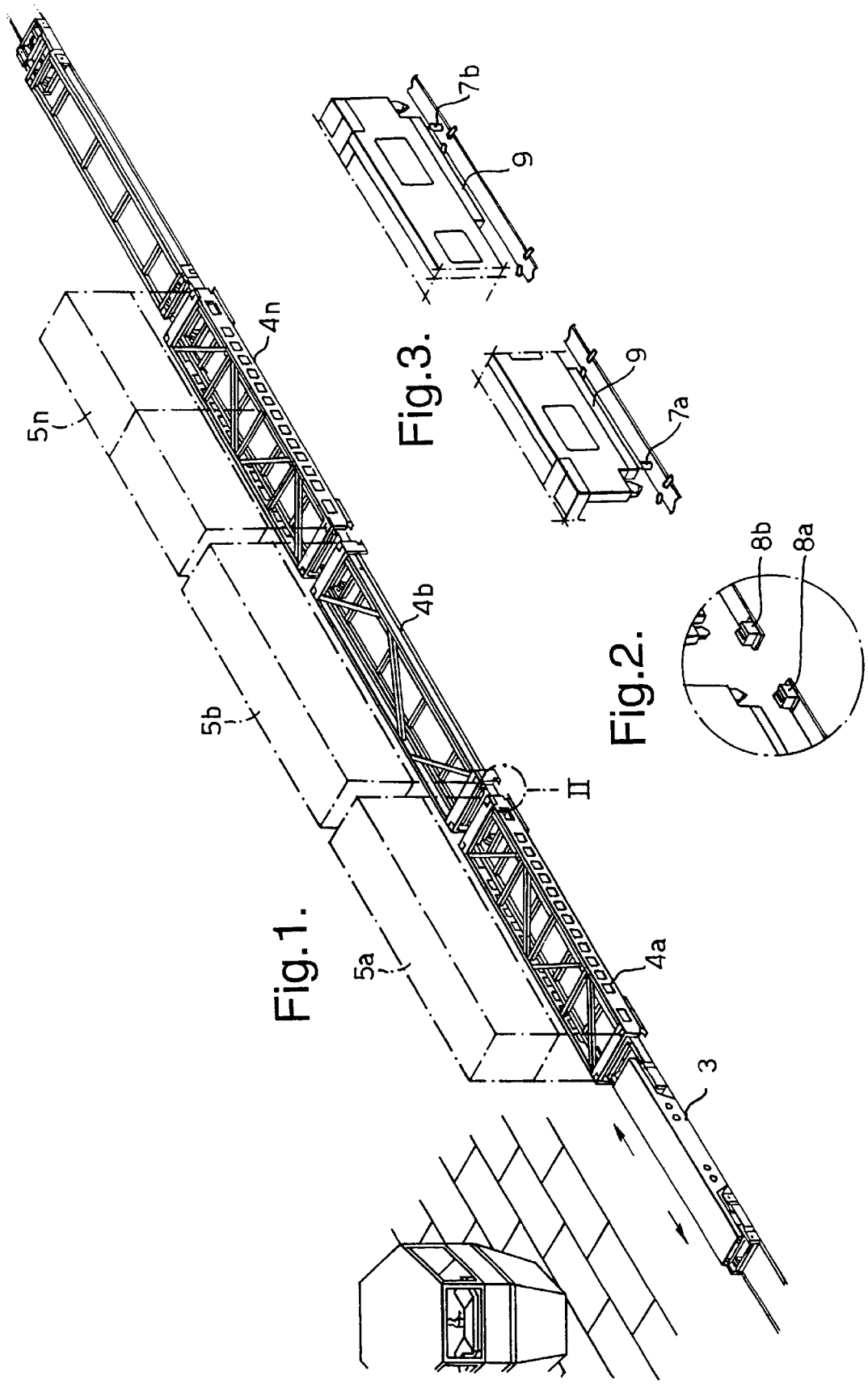

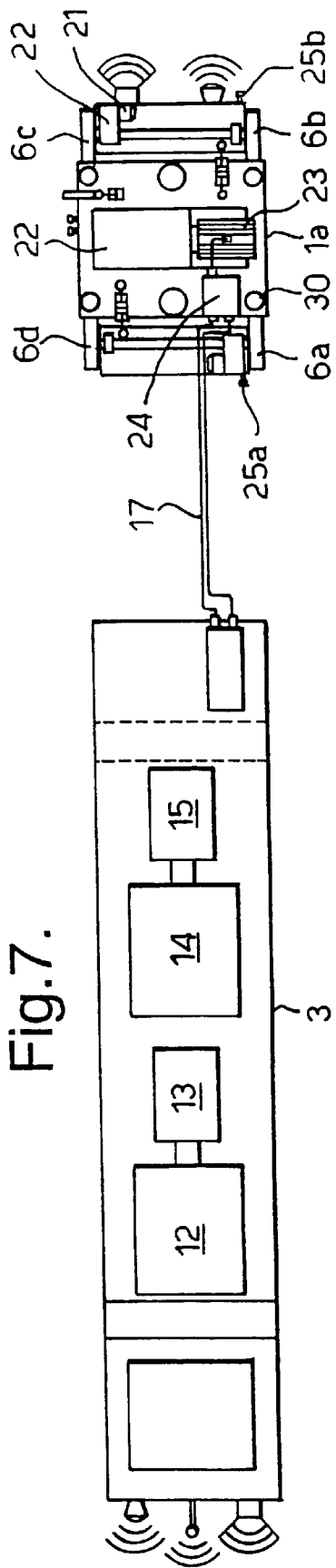
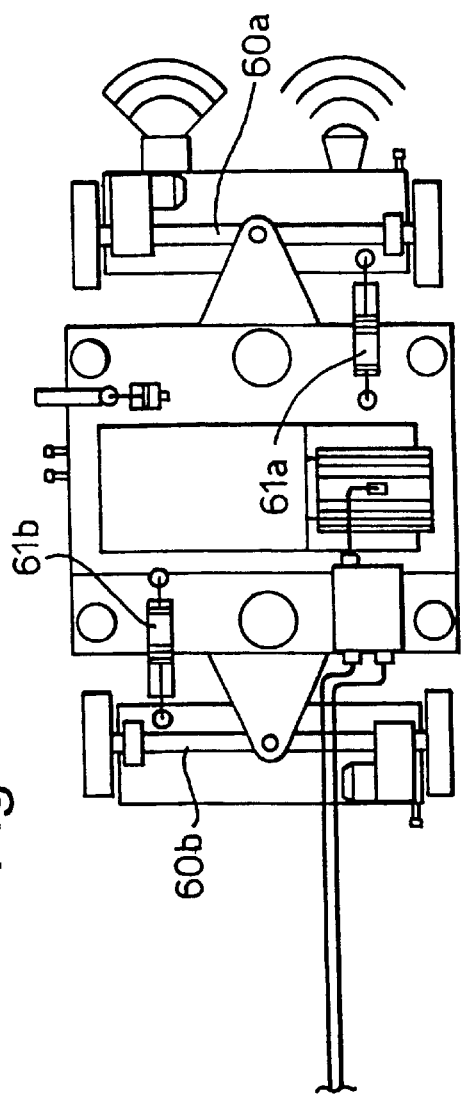

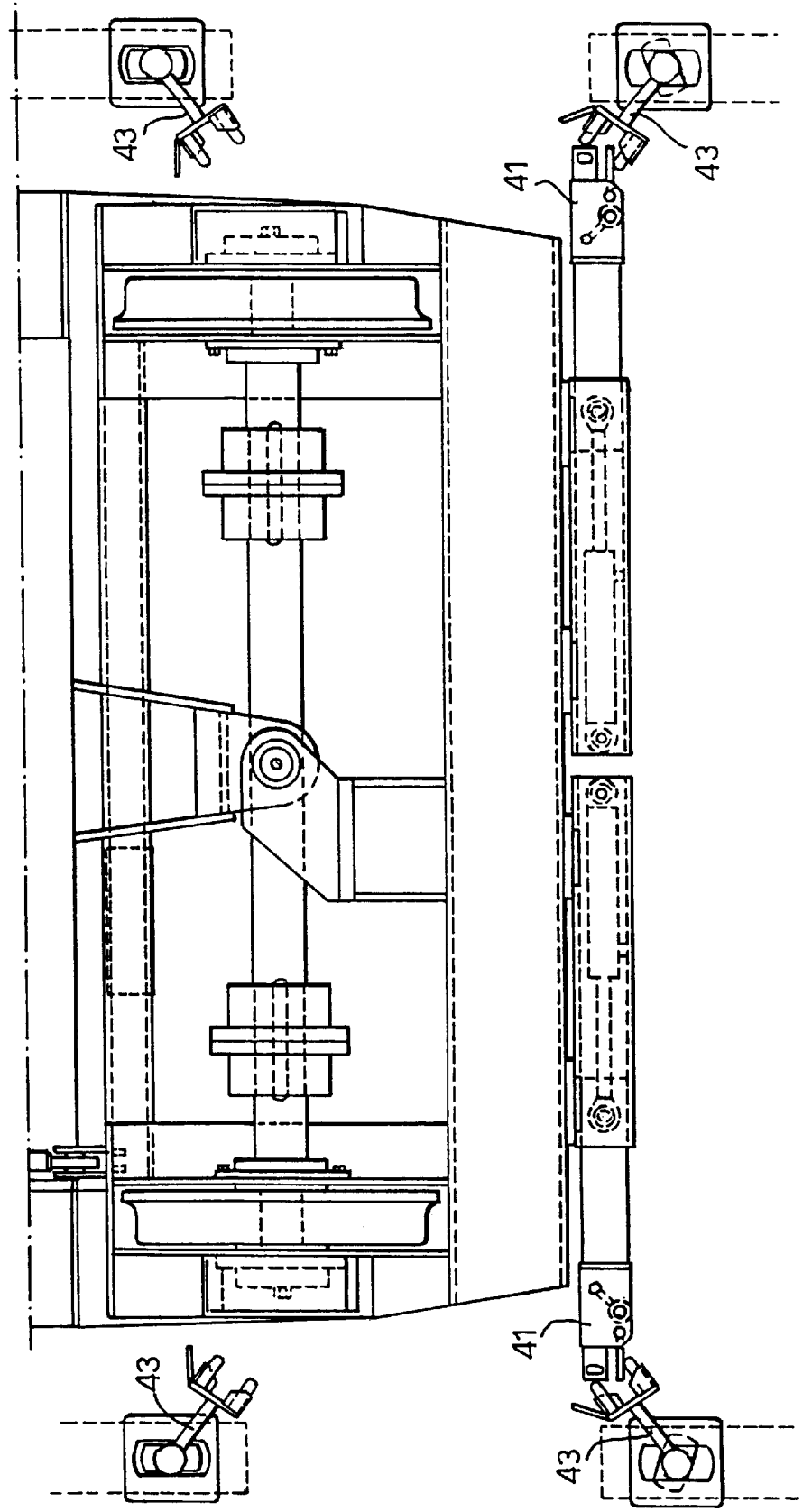

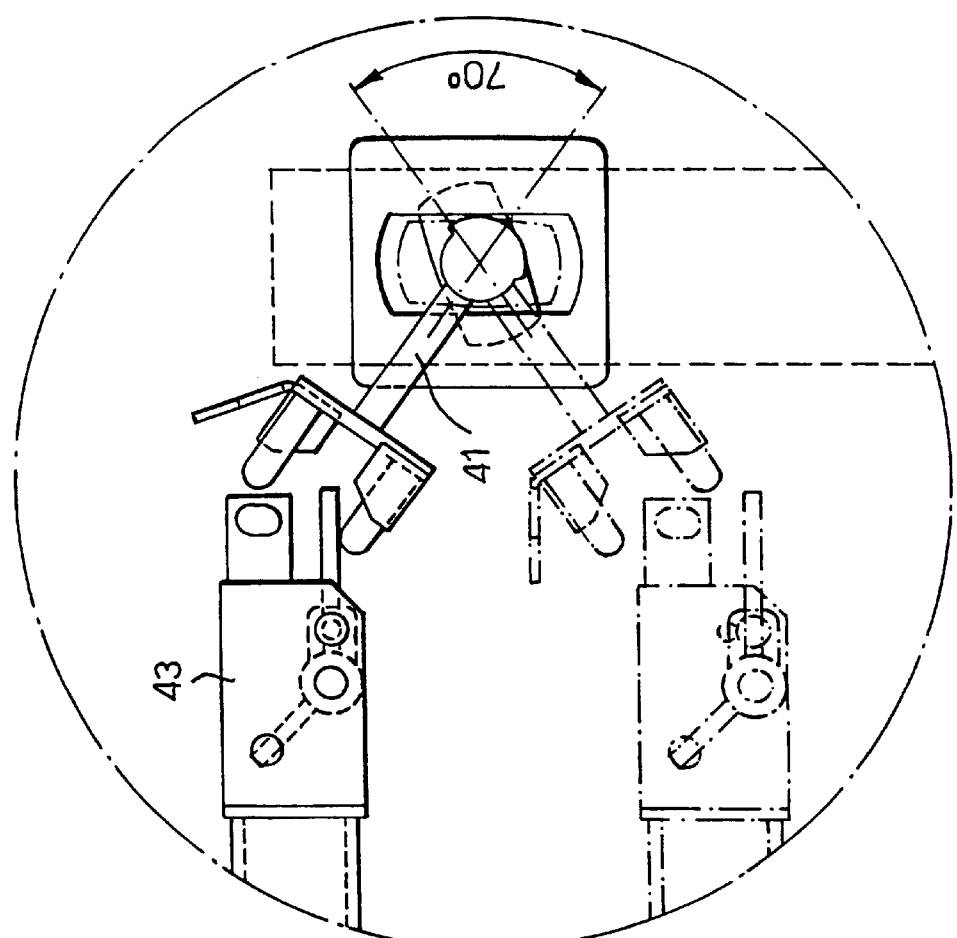
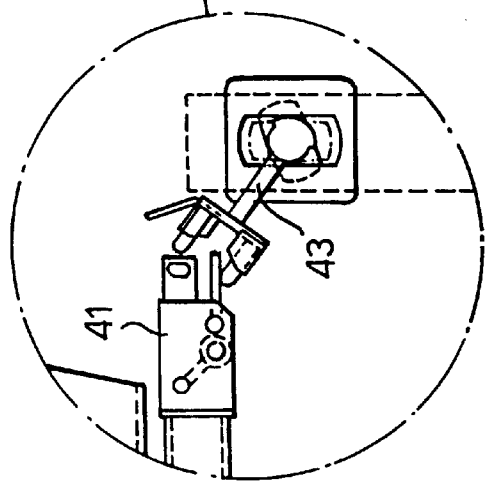
Fig.9.

Fig. 12.
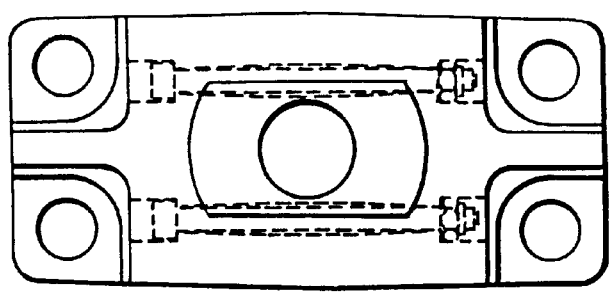
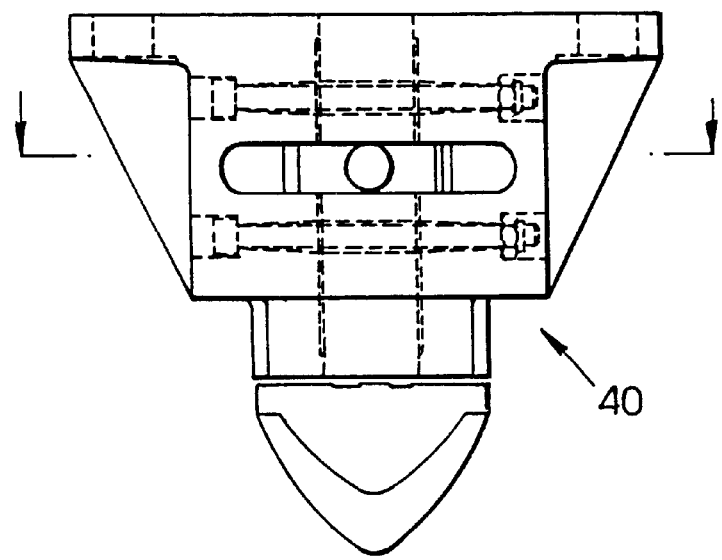
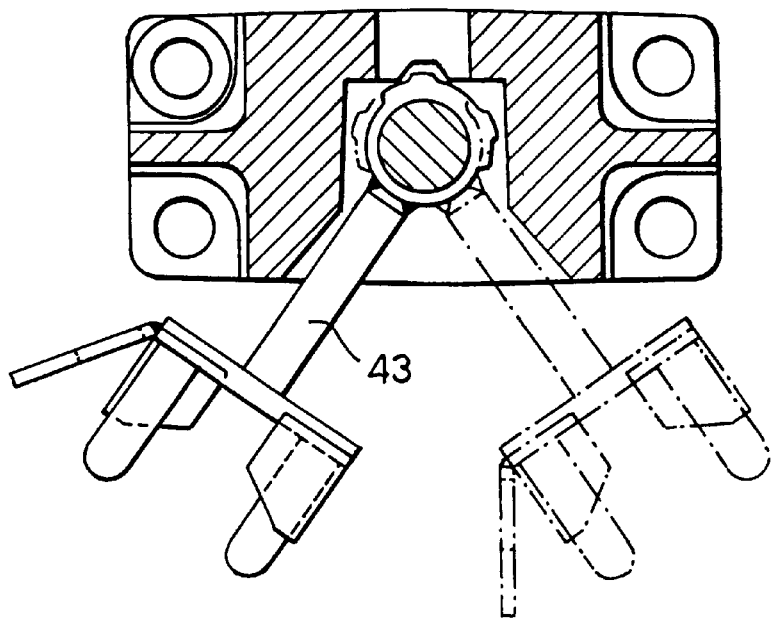

US 6,435,796 B1

METHOD AND ARRANGEMENT FOR TRANSPORTING LOAD UNITS

FIELD OF THE INVENTION

The present invention relates to a method an apparatus for transporting load units, for example, containers, and more specifically relates to loading and unloading containers onto and off from larger transport vessels using a transport trolley.

PRIOR ART

From U.S. Pat. No. 5,618,148 there are known a method and an arrangement for transporting larger units, especially for loading and unloading containers, the method and system being developed to provide a loading and unloading system which is specifically fast and effective, and which particularly finds application in connection with high-speed container boats.

The present invention is a further development of a system as disclosed in U.S. Pat. No. 5,618,148, and the development is specifically concentrated upon making such loading and unloading systems even faster and more automatically operated.

From UK patent application 2 291 032 (Søorensen/Thorny Croft Guilds & Co. Inc.) there is known an apparatus for use in transporting a load wherein a plurality of transporters are arranged as a train having a predetermind length. Preferably the prior art train is formed such that the length thereof corresponds substantially to the effective length of a selected position on a cargo deck of the vessel to be loaded.

However, according to said GB 2 291 032 there are suggested transporters comprising gaseous supporting means arranged at each corner of each transporter, which as an outset are independent of any driving rails. However, although such a gaseous support arrangement is independent of any driving rails the arrangement according to UK 2 291 032 is dependent upon guiding rails along which the transporters have to be guided when entering the transport vessel in question. Further, the traction force for the train of transporters is provided by a large locomotive which in turn requires friction contact against the surface on which the train is to be transported. On the other hand the gaseous supporting means require a smooth base, which is very difficult to provide, especially at outdoors ports.

OBJECTS OF THE INVENTION

As stated above, an object of the present invention is to provide an improvement of the system according to U.S. Pat. No. 5,618,148, by refining the technologies thereof in a new and effective manner.

Further, it is an object of the present invention to avoid the disadvantages with which the arrangement according to UK 2 291 032 are hampered, i.e. to present a method and an arrangement wherein commonly available rails can be used on deck, which rails can communicate with associated rails on shore, and wherein special transfer trolleys will be part of the port equipment for being maintained on land.

A still further object of the present invention is to provide a trolley train which comprises trolleys having their own lifting and driving equipment, as well as comprising a power trolley which can easily pass underneath the pallets or pallet loads in question, so as to drive the trolley train in any direction underneath the corresponding pallet train.

Yet another object of the present invention is to provide a unique locking system which can be operated by the trolleys themselves, so as to further increase the automatic and personal-free operation of the system.

Another object of the present invention is to provide cargo trolleys provided with means for driving in a safe and efficient manner also through curves of the associated rails.

SUMMARY OF THE INVENTION

The above objects are achieved by a method and an arrangement according to the invention, and more specifically the idea and solution as stated in the characterizing clause of the enclosed patent claim 1 and patent claim 12, respectively.

Further features and advantages of the present invention will appear from the following description taken in connection with the enclosed drawings, as well as from the further patent claims enclosed herewith.

BRIEF DISCLOSURE OF THE DRAWING

FIG. 1 is a general perspective layout of a first embodiment of an arrangement according to the invention, whereby the method according to the invention can be carried out.

FIG. 2 illustrates on a larger scale a perspective view of a possible locking system to be used on deck.

FIG. 3 is a perspective view, on a larger scale illustrating details of an embodiment of positioning studs, for example used on land.

FIG. 7 is a schematical plan view illustrating a specific embodiment of a power trolley according to the present invention, as well as control and driving details included in a specific embodiment of any transfer trolley according to the present invention.

FIG. 8 is on a larger scale, a top view of the end trolley, illustrating an embodiment of the lashing control system included therein.

FIG. 9 is on a still larger scale, a top view illustrating details of the lashing control system included in the end trolley according to FIG. 8.

Figure 10:
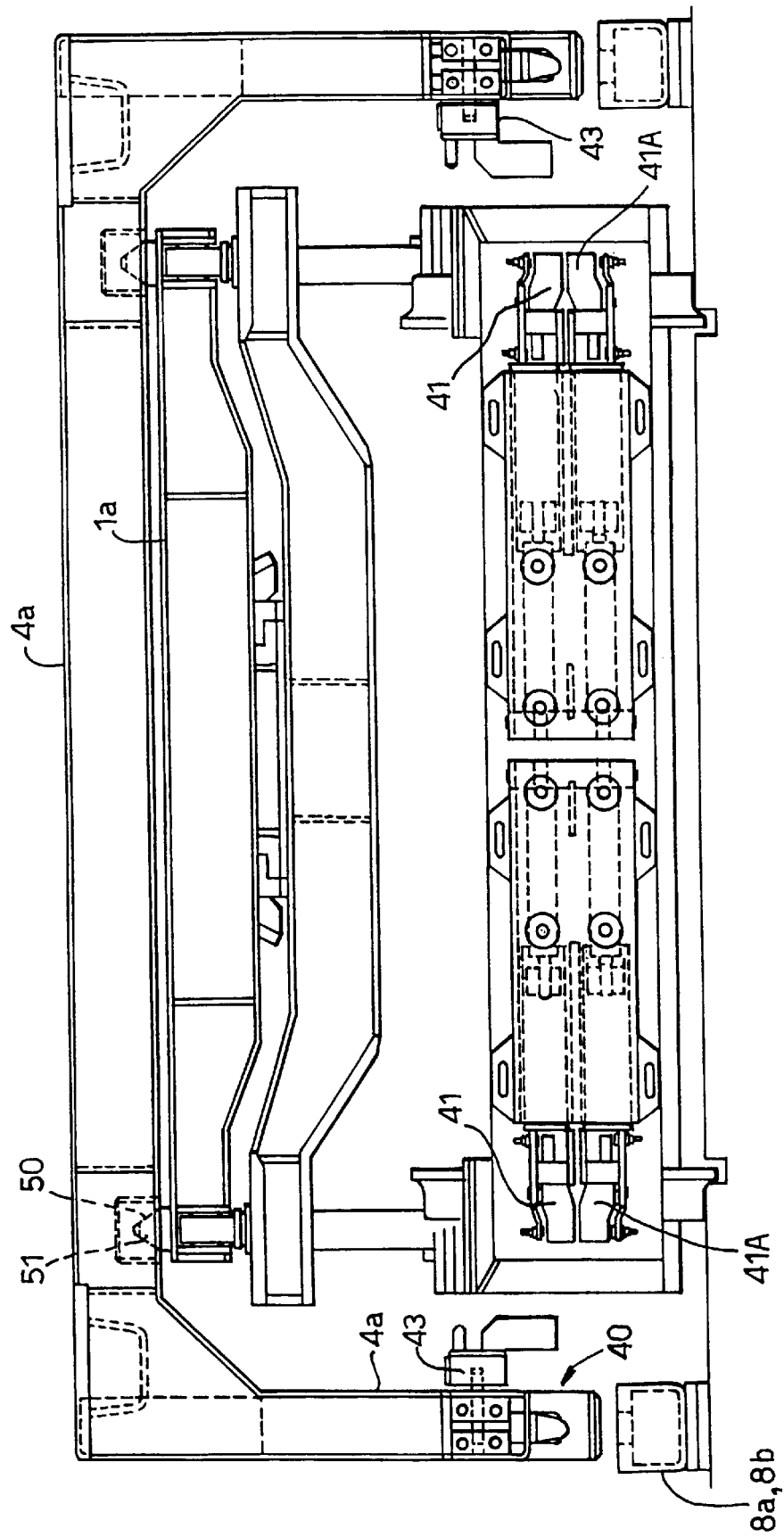

FIG. 10 in an end view of the end trolley as illustrated in FIG. 8, here in a raised position of the pallet thereon.

Figure 11:
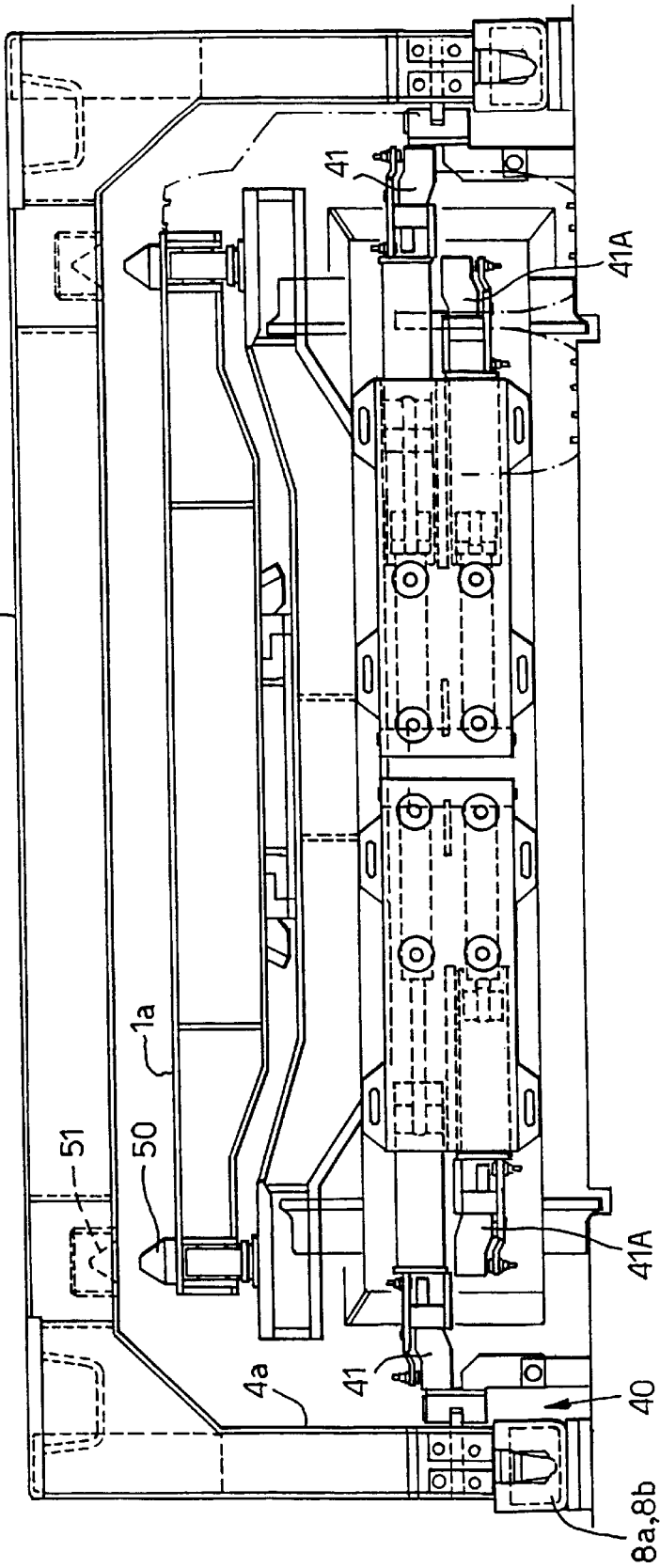

FIG. 11 is an end view similar to FIG. 10, but here illustrating the pallet in a lowered and positioned as well as latched position.

FIG. 12 is a plan view, partly in section, illustrating further details of the lashing system according to the present invention.

FIG. 13 is a schematical plan view of the control and driving means of a transport trolley, similar to what is illustrated in FIG. 7, but comprising further details regarding an embodiment of radial beam adjustment included therein.

DESCRIPTION OF EMBODIMENTS

In the enclosed drawings there are illustrated embodiments of an improved loading and unloading system, especially for serving high-speed container vessels.

The present CP-train (container platform train) system has been developed to provide a fast and realiable loading and unloading system for containers up to 45", swap bodies, trailers, pallets, slip sheets and outsize loads. The CP-train system is designed to a) Reduce the turn round times of the ship
b) Reduce the cargo handling cost
c) Provide more efficient use of space
d) Provide an efficient and cost effective intermodal transfer
e) Reduce the dwell time of the cargo in the terminal
f) Reduce the damage both to cargo and equipment
g) Provide a system that is compatible with the EDI requirements of the modern logistics industry
h) Reduced terminal labour requirements The CP-train is designed for an intermodal terminal operation connecting ship loading/unloading with rail/road pick up and delivery. The system involves the loading and unloading of unitised cargo to or from vessels, normally through stern doors using a link-span or ramp to provide for the difference in height between the cargo decks and the quay.

The terminal can be arranged in several different ways to suit the particular operational requirements of the location selected.

Figure 4:
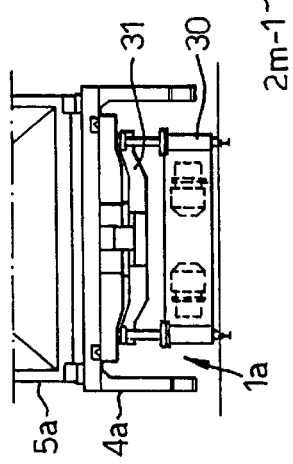
FIG. 4 is an end view illustrating the resting situation of an embodiment of a transport trolley according to the present invention.
Figure 5:
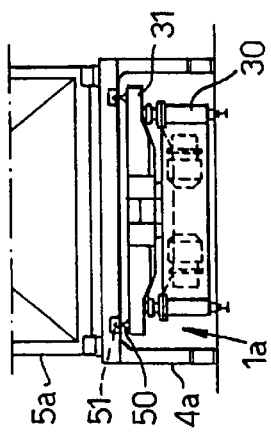
FIG. 5 is an end view similar to FIG. 4, but illustrates the driving situation of said embodiment of transport trolley.
Figure 6:
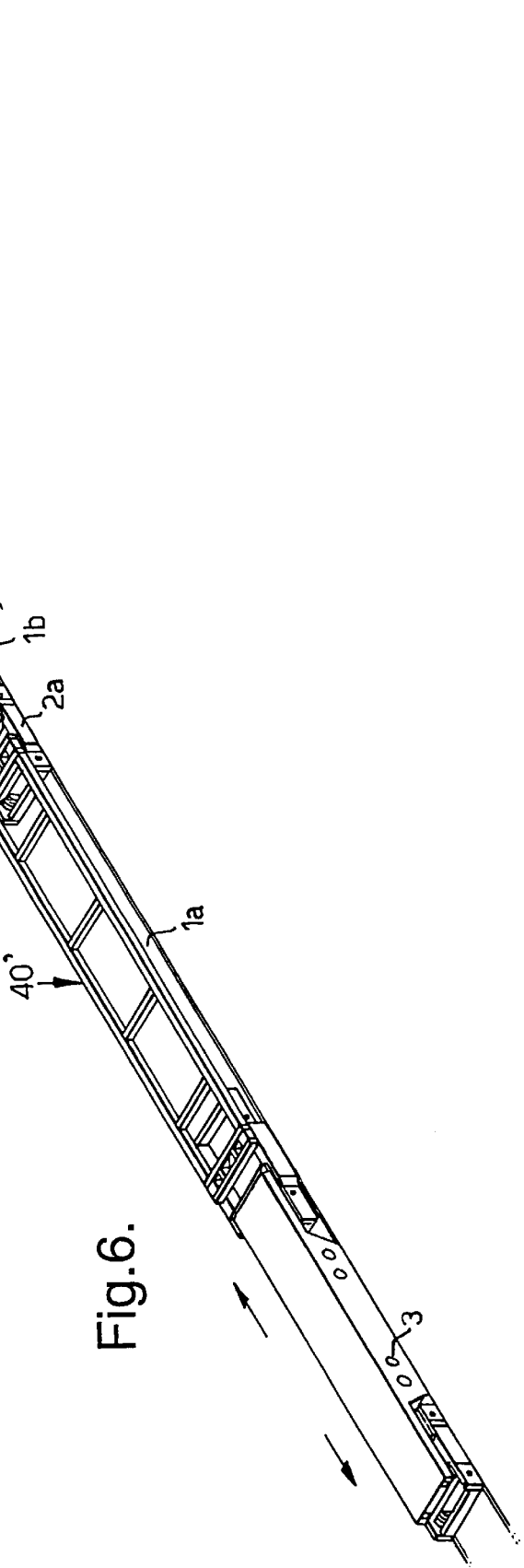
FIG. 6 is a perspective view illustrating the train of transport trolleys only, as compared with FIG. 1, and illustrating further details of such trolleys, especially the so-called end trolley.

As best illustrated in FIGS. 1–7, an arrangement according to the present invention may comprise a number of motorized trolleys, here designated by $1a, 1b \ldots 1n$, said trolleys being joined together by connecting frames $2a, 2b \ldots 2m$, to form a train, see especially FIG. 6.

In the illustrated embodiment electric power may be supplied to the individual trolleys $1a, 1b \ldots 1n$ by one or more power trolleys, in the illustrated embodiment as shown on FIG. 1 and FIG. 6, one power trolley, here designated by reference numeral 3, and comprising details as illustrated more specifically in FIG. 7.

The entire train including the power trolley or trolleys may preferably by designed to pass under specially designed load bearing platforms or cargo platforms, here also designed as cargo pallets $4a, 4b \ldots 4n$, which have been preassembled to a train corresponding to the trolley train, and on which train of cargo pallets the cargo units $5a, 5b \ldots 5n$ have been preloaded so that the preloaded pallets or platforms can be lifted prior to being arranged in a train ready for transporting to and from the ship.

As further illustrated in FIG. 7, an electrically driven hydraulic system on each trolley, here trolley $1a$, provides traction to the wheels $6a$–$6d$, as well as provides power for braking, cleating and lifting systems installed on the respective trolley.

On board the ship the train of platforms with cargo, for example as illustrated in FIG. 1, will be arranged in lanes parallel to the ship center line.

The loading and unloading operation will be as follows.

Before the ship arrival the export cargo is secured on platforms $4a, 4b \ldots 4n$ as illustrated in FIG. 1, in a pattern corresponding to the proposed stowage of the ship.

The operation may start with removing the first two lanes of platforms on board a ship. An empty train of trolleys runs under the appropriate row of platforms, and stops in the correct position automatically whilst simultaneously releasing the securing devices, as this will be explained in further details with reference to FIGS. 8–12.

In order to facilitate positioning of the trolleys $1a, 1b \ldots 1n$ underneath the corresponding train of platforms $4a, 4b \ldots 4n$, there may as this is illustrated in FIG. 4 and 5, and in further details in FIGS. 8–12, be arranged guiding pins 50 at the top of each trolley $1a$ for fitting into corresponding holes 51 in the bottom of the individual platforms $4a$. Each of the cargo trolleys in the trolley train will then lift each platform from the deck and bring the train of platforms through a series of switches to pre-assigned locations in the terminal in question. In this terminal the platforms will be lowered onto positioning pins or studs, for example as illustrated by reference numeral $7a$–$7b$ in FIG. 3, whereafter the empty CT-train is moved in any direction in order to pick up export cargo arranged as another train of preloaded platforms corresponding to the empty trolley train in question.

As the import trains clear the switches waiting trains will move export cargo into the vacated lanes on said vessel, and the platforms are lowered onto positioning stands $8a$–$8b$, for example as illustrated in FIG. 2, arranged on the vessel deck. Upon removal of the empty CP-trains the positioned trains of pallets will thereby be automatically secured in said positioning stands, in a manner which will be further discussed in connection with FIGS. 8–12.

The unloading/loading operation is repeated until loading/unloading of the vessel is completed.

To further ensure correct platform positioning on land, there may be used conical studs $7a$–$7b$ as illustrated in FIG. 3, for example of 60–80 mm height, positioned appropriately along the terminal tracks, said studs $7a$–$7b$ being arranged to fit into corresponding holes in the platform legs 9 when said platforms are being lowered. Similar studs may be inserted along the lanes on the cargo decks on boards.

It is to be understood that the train or trains of platforms will remain onboard with its cargo, while the CP-trains comprising said transport trolleys and associated power trolleys will return to the terminal for further land-based operations.

It is further to be understood that said CP-train system is designed to provide a fast terminal throughput and a minimum cargo transfer time and related cost. Cargo is transferred directly from the platform to the road or rail chassis. It is also to be understood that the system may be designed for direct transfer of a train of platforms from one vessel to another.

The CP-train may appropriately run on railway tracks which are arranged to provide an efficient flow of cargo through the terminal. The system may be designed to be controlled by a data system that is consistent with the state of the art logistics handling systems with automatic or semi-automated gate and cargo booking systems.

The CP-train may be designed for logistics systems between dedicated ports. The control system and cargo stowage aspect of the system are required to be co-ordinated between the ports concerned. The system design should encorporate emergency procedures to discharge vessels using conventional Ro-Ro port handling equipment in the event that a dedicated terminal is not available to the service.

As illustrated in FIG. 7 the power trolley 3 is arranged to supply the CP-train trolleys, here the trolley $1a$, said trolleys $1a$–$1b \ldots 1n$, thereby being self-propelled, with tractive energy.

It is to be understood that the power trolley 3 should provide sufficient tractive energy to propel the train in accordance with operational criteria, as well as produce sufficient energy to lift the cargo loads in accordance with operational criteria.

Further, the power trolley 3 should comprise control means supervising the brake and safety systems of the train.

The maximum height of the power trolley 3 should not exceed the maximum height of any transport trolley, for example being less than 750 mm or otherwise permit the power trolley to pass under a line of platforms.

Appropriately, the power trolley may be built up of modules, each containing a complete power pack for example a diesel motor 12, an electric generator 13, a second diesel motor 14 and a second generator 15, the electric control allowing high voltage to be distributed to appropriate power supply cables 17, it being understood that the power trolleys may be coupled for operation in tandem, for thereby meeting the supply requirements of a particular trolley train.

As further illustrated in FIG. 6 and 7 a CP-train trolley, or transport trolley, may have installed train couplings on top of the trolley structure so that trolleys in a train can be joined together on a frame structural basis. The coupling may comprise king pins preferably having a two-plane movement to allow the trolleys to turn around curves or climb a slope.

The vertically operating wheels 6a–6d provided with flanges shall interact between the trolley and the rails in the terminal area, and the wheels may preferably be mounted to the trolley structure using high quality roller bearings.

Preferably a minimum of two wheels on each trolley may be mounted with an integrated shaft and planetary gear system 20 with integrated parking brakes 21, said brakes being provided with a fail-safe brake system being released for example by hydraulic pressure.

Each trolley la may be provided with an integrated hydraulic system 22 with variable displacement motors running in closed regenerative circuit. Each local hydraulic system 22 may be powered by at least two electric motors 23, which in turn is connected to an electric control system 24.

Possibly, the transport trolleys may be provided with DC/AC railway drives, or a solution with hydraulically distributed power may be contemplated.

Further, each trolley la is provided with necessary sensors 25a, 25b to be connected to the master or power trolley via an I/O bus and a control table thereof. As further illustrated in FIG. 4 and 5 each trolley 1a will be provided with hydraulic sylinders 30 for lifting its cargo frame 31 and thereby also the associated cargo pallet 4a with container or other cargo units.

In general all platforms or pallets should be designed to optimise weight. All platforms for containers may be equipped with standard twist locks, and the pallet structure should be provided with conical steel guides for positioning against the cones in the vessel deck structure and for positioning against the frames on the associated CP-train.

The connecting frames of the trolleys can be provided as an open steel structure which is able to position and carry said platforms, said frames being arranged for easily connection to said trolley king pins.

As more specifically illustrated in FIG. 8–12, the present system provides a unique locking system.

As stated above the platforms for containers should be provided with twist locks or similar, and in FIG. 8–12 there is illustrated a preferred embodiment of how the automatic locking system according to the present invention can be brought into practice.

In FIG. 10 and FIG. 11 it is illustrated how the platform 4a is being lowered into position, i.e. from a raised position in FIG. 10 to a lowered position in FIG. 11, at the same time as the securing element 40 is being lowered into a position prepared for securement.

After the lowered position has been reached, as illustrated in FIG. 11 the trolley la will be free to be retracted from underneath the platform 4a, and when starting its retrieval operation a first set of trolley locking arms 41 will be arranged to be brought in contact with protruding platform locking arms 43, so that when the end trolley in passes each of the securing devices 40, the sequential operation of pivoting each of the associated platform locking arm will take place, which will result in securing the lowered pallets 4n . . . 4a sequentially as the trolley train is returned to the terminal.

It is to be understood that when an empty train of trolleys enters underneath a train of platforms, then a second set of trolley locking arms 41A will unlock each of the securing devices in question, but then in an oppositely sequential operation.

Further details of the protruding platform locking arms 43 is illustrated in FIG. 12, and in FIG. 8 there are illustrated two positions thereof, i.e. an upper open position as well as a lower locked position, as this is also illustrated in FIG. 9.

It is to be understood that by having such an automatic securing system it is not necessary to have a crew on board for locking the individual securing means, which further contributes to a rapid and economic transfer of goods.

In order to improve the present system such that any train can be driven through curves and ascend and descend slopes each trolley is provided with a so-called radial beam adjustment, as this is illustrated in FIG. 7, and as further illustrated in FIG. 13.

The radial beam adjustment means will involve that the two shafts 60a, 60b of the trolley in question can be adjusted to an angle corresponding to the expected curve radius. This is important in order to obtain a "one contact point" for the wheel flange throughout the curve. This ability may reduce the flanges friction and the associated climbing of the wheel.

In FIG. 7 and 13 the radial beam adjustment means have been incorporated as two sylinders 61a and 61b, respectively said sylinders 61a and 61b being operated when one of the sensors 25a or 25b passes a point at the start or at the end of a rail curve.

It is also to be understood that a coupling can be installed to cater for any free wheeling throughout the curve.

It is also to be understood that conical wheels with a stiff shaft can be installed, so as to secure a safe "sinus" run along the rails through the straight parts thereof.

What is claimed is:

1. A method for transporting cargo on platforms that are locked at respective first locations from their first locations to respective second locations, the method comprising:

inserting a trolley train comprising a plurality of interconnected trolleys beneath the platforms to unlock the platforms from their respective first locations;

loading the platforms and the cargo thereon onto the trolley train;

moving the trolley train and the platforms thereon to second respective locations;

unloading the platforms onto their respective second locations; and withdrawing the trolley train from beneath the platforms to lock the platforms to their respective second locations.

2. The method of claim 1 wherein the trolley train comprises locking/unlocking members and wherein the platforms and first and second locations comprise locking mechanisms, and wherein inserting the trolley train beneath the platforms and withdrawing the trolley train from beneath the platforms comprises engaging and disengaging the locking/unlocking members with the locking mechanisms.

3. The method of claim 1, wherein the path from the first locations to the second locations comprises a curve, the method comprising sensing the curve and adjusting the trolley wheels to the radius of the curve.

4. The method of claim 1 comprising transporting cargo on platforms from respective third locations to the first locations while cargo is moved from first locations to the second locations.

5. The method of claim 4, comprising using a first trolley train to move cargo from the first locations to the second locations and a second trolley train to move cargo from the third locations to the vacant first locations.

6. The method of claim 1, wherein the cargo comprises a plurality of cargo units, wherein there is one cargo unit per platform, and wherein the method comprises loading and unloading one platform per trolley.

7. The method of claim 1, wherein loading platforms and unloading platforms comprises operating a hydraulic mechanism to raise and lower the trolley beneath the platforms.

8. The method of claim 7, wherein each trolley comprises a drive mechanism and wherein moving the trolley train comprises activating the drive mechanisms on the trolleys.

9. The method of claim 7 or claim 8 wherein the trolley train comprises at least one power trolley to power the trolley mechanisms.

10. The method of claim 1 controlling the power trolley from a remote location.

11. The method of claim 1 comprising providing rails having locking mechanisms for the platforms, the rails extending from the first locations to the second locations, the method comprising moving the trolley train on the rails and locking the platforms to the rails at the second locations.

12. An apparatus for transporting cargo from one location to another, comprising:

a plurality of cargo platforms;

locking mechanisms for locking the platforms in place at respective first and second locations;

a trolley train comprising a plurality of interconnected trolleys configured for insertion beneath the platforms and comprising a mechanism for rising to load the platforms onto the trolleys and for lowering to set the platforms down;

locking/unlocking members on the trolley train configured to engage the locking mechanisms to unlock the platforms from their respective first locations when the trolley train is inserted beneath the platforms and to lock the platforms at their respective second locations when the trolley train is withdrawn from beneath the platforms.

13. The apparatus of claim 12 wherein each trolley train has two ends and comprises locking/unlocking members at both ends, and wherein the locking/unlocking members at the end of a trolley first inserted beneath a platform unlocks the locking mechanism as the train is inserted beneath the platforms and the locking/unlocking member at the other end locks the locking mechanism as the train is withdrawn from beneath the platforms.

14. The apparatus of claim 12 or claim 13 wherein the train moves along a rail and wherein the trolleys comprise radial beam adjustment means for allowing radial beam adjustment when a trolley encounters a curve on the rail.

15. The apparatus of claim 12 or claim 13 comprising at least one power trolley to provide power for the operation of other trolleys in the train.

16. The apparatus of claim 12 or claim 13 wherein the trolley train comprises remote control means to permit control of trolley movement from a remote location.

17. The apparatus of claim 12 or claim 13 wherein the trolley train comprises at least one trolley that comprises a position sensor.

* * * * *

UNITED STATES PATENT AND TRADEMARK OFFICE
CERTIFICATE OF CORRECTION

PATENT NO.     : 6,435,796 B1
DATED          : August 20, 2002
INVENTOR(S)    : Oyvind T. Iversen It is certified that error appears in the above-identified patent and that said Letters Patent is hereby corrected as shown below:

Title page,
Item [57], ABSTRACT,
Line 7, after "of" delete "standard" and insert therefor -- standardized --

Drawings,
Fig. 7, between Reference Numeral, "6c" and "21" delete "22" (second occurrence) and insert therefor -- 20 --

Column 1,
Line 5, after "Method", delete "an" and insert therefor -- and --
Line 23, after "2 291 032", delete "Sørenson" and insert therefor -- Søorensen --

Column 2,
Line 17, after "THE", delete "DRAWING" and insert therefor -- DRAWINGS --
Line 22, after "a perspective view of" insert -- that portion of Fig. 1 enclosed by area II showing --
Line 47, after "10" delete "in" and insert therefor -- is --

Column 3,
Line 1, after "to" delete "45" " and insert therefor -- 45' --
Line 4, after "turn", delete "round" and insert therefor -- around --
Line 13, after "h)" delete "reduced" and insert therefor -- reduce --
Line 36, after "preferably" delete "by" and insert therefor -- be --

Column 5,
Line 37, after "hydraulic" delete "sylinders" and insert therefor -- cylinders --
Line 48, after "for" delete "easily" and insert therefor -- easy --
Line 67, after "trolley", delete "in" and insert therefor -- 1n --

UNITED STATES PATENT AND TRADEMARK OFFICE
CERTIFICATE OF CORRECTION

PATENT NO.    : 6,435,796 B1
DATED         : August 20, 2002
INVENTOR(S)   : Oyvind T. Iversen It is certified that error appears in the above-identified patent and that said Letters Patent is hereby corrected as shown below:

<u>Column 6,</u>
Line 2, after "locking" delete "arm" and insert therefor -- arms. --
Line 12, before "illustrated", delete "is" and insert therefor -- as --
Line 31, after "two" delete "sylinders" and insert therefor -- cylinders --
Line 32, after "Said" delete "sylinders" and insert therefor -- cylinders --

Signed and Sealed this

Twenty-seventh Day of July, 2004

JON W. DUDAS
*Acting Director of the United States Patent and Trademark Office*